US012457018B2

(12) United States Patent  (10) Patent No.: US 12,457,018 B2
Nguyen et al.  (45) Date of Patent: Oct. 28, 2025

(54) HYBRID JOINT TRANSMISSION FOR MULTIPLE ANTENNA COORDINATED MULTIPOINT SYSTEMS

(71) Applicant: Samsung Electronics Co., Ltd., Suwon-si (KR)

(72) Inventors: Thuy Van Nguyen, Plano, TX (US); Yang Li, Plano, TX (US); Yeqing Hu, Allen, TX (US); R A Nadisanka Perera Rupasinghe, Allen, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 18/484,293

(22) Filed: Oct. 10, 2023

(65) Prior Publication Data

US 2024/0187055 A1   Jun. 6, 2024

Related U.S. Application Data

(60) Provisional application No. 63/419,226, filed on Oct. 25, 2022.

(51) Int. Cl.
*H04B 7/0456* (2017.01)
*H04L 1/1812* (2023.01)
*H04W 72/23* (2023.01)

(52) U.S. Cl.
CPC ......... *H04B 7/0486* (2013.01); *H04L 1/1812* (2013.01); *H04W 72/23* (2023.01)

(58) Field of Classification Search
CPC .... H04B 7/0486; H04B 17/328; H04B 7/024; H04L 1/1812; H04W 72/23
See application file for complete search history.

(56) References Cited

U.S. PATENT DOCUMENTS

| | | | |
|---|---|---|---|
| 10,680,682 B2 | 6/2020 | Fakoorian et al. | |
| 11,211,985 B2 * | 12/2021 | Wu | ........ H04L 5/0048 |
| 11,412,464 B2 | 8/2022 | John Wilson et al. | |
| 2013/0194943 A1 | 8/2013 | Davydov et al. | |
| 2020/0383091 A1 | 12/2020 | Park et al. | |
| 2021/0036818 A1 | 2/2021 | Eldessoki et al. | |
| 2022/0029746 A1 | 1/2022 | Noh et al. | |

(Continued)

FOREIGN PATENT DOCUMENTS

CN   115088225 A   9/2022
WO   WO-2023206511 A1 * 11/2023

OTHER PUBLICATIONS

International Search Report and Written Opinion issued Feb. 1, 2024 regarding International Application No. PCT/KR2023/016561, 9 pages.

(Continued)

*Primary Examiner* — Vineeta S Panwalkar

(57) ABSTRACT

A network entity includes a memory and a processor operable coupled to the memory. The processor is configured to determine a hybrid joint transmission (Hybrid-JT) signal for transmission from a wireless network associated with the network entity to a user equipment (UE). The Hybrid-JT signal includes a diversity joint transmission (Div-JT) component and a multiplexing joint transmission (Mux-JT) component. The processor is further configured to instruct the wireless network to transmit the Hybrid-JT signal to the UE.

20 Claims, 10 Drawing Sheets

(56) References Cited

U.S. PATENT DOCUMENTS

| | | |
|---|---|---|
| 2022/0095304 A1 | 3/2022 | Muruganathan et al. |
| 2022/0103235 A1 | 3/2022 | Raghavan et al. |
| 2022/0209902 A1 | 6/2022 | Gao et al. |
| 2022/0376744 A1 | 11/2022 | Al Jurdi et al. |
| 2023/0061346 A1 | 3/2023 | Park et al. |
| 2024/0334316 A1* | 10/2024 | Zhou .................... H04W 92/10 |

OTHER PUBLICATIONS

Extended European Search Report issued Sep. 17, 2025 regarding Application No. 23883057.4, 12 pages.

* cited by examiner

| Hybrid-JT → DivJT | | |
|---|---|---|
| UE antenna | TRP1 | TRP2 |
| 1 | x1 | x1 |
| 2 | | |
| 3 | x2 | x2 |
| 4 | | |

Case 1: TRP2 follows the order of TRP1.

| Hybrid JT | | |
|---|---|---|
| UE antenna | TRP1 | TRP2 |
| 1 | x1 | x1 |
| 2 | | x3 |
| 3 | x2 | |
| 4 | | |

Case 2: TRP2 will help transmit one layer and transmit new layer to make rank-3 transmission.

| Hybrid-JT → MUXJT | | |
|---|---|---|
| UE antenna | TRP1 | TRP2 |
| 1 | x1 | |
| 2 | | x3 |
| 3 | x2 | |
| 4 | | x4 |

Case 3: TRP2 will transmit two new layers to make rank-4 transmission.

FIG. 7

| Hybrid JT | | |
|---|---|---|
| UE antenna | TRP1 | TRP2 |
| 1 | x1 | x1 |
| 2 | | |
| 3 | x2 | x2 |
| 4 | | |

Case 1: TRP2 removes transmission of x1 and allocate more power on x2 transmission

| Hybrid JT | | |
|---|---|---|
| UE antenna | TRP1 | TRP2 |
| 1 | x1 | x1 |
| 2 | | x3 |
| 3 | x2 | |
| 4 | | |

Case 2: Rank-3 transmission. TRP2 might remove transmission of x1 and allocate more power to transmit new layer x3

| Hybrid JT | | |
|---|---|---|
| UE antenna | TRP1 | TRP2 |
| 1 | x1 | x1 |
| 2 | | x1 |
| 3 | x2 | |
| 4 | | |

Case 2: Rank-2 transmission. TRP2 might only power-boost an existing layer x1

| Hybrid JT | | |
|---|---|---|
| UE antenna | TRP1 | TRP2 |
| 1 | x1 | |
| 2 | | x3 |
| 3 | x2 | |
| 4 | | x4 |

Case 3: Instead of rank-4 transmission, TRP2 might allocate more power to transmit only one new layer

FIG. 8

HYBRID JOINT TRANSMISSION FOR MULTIPLE ANTENNA COORDINATED MULTIPOINT SYSTEMS

CROSS-REFERENCE TO RELATED APPLICATION(S) AND CLAIM OF PRIORITY

This application claims priority under 35 U.S.C. § 119(e) to U.S. Provisional Patent Application No. 63/419,226 filed on Oct. 25, 2022. The above-identified provisional patent application is hereby incorporated by reference in its entirety.

TECHNICAL FIELD

This disclosure relates generally to wireless networks. More specifically, this disclosure relates to hybrid joint transmission for multiple antenna coordinated multipoint systems.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides methods and apparatuses for hybrid joint transmission for multiple antenna coordinate multipoint systems.

In one embodiment, a network entity (NE) is provided. The network entity includes a memory and a processor operable coupled to the memory. The processor is configured to determine a hybrid joint transmission (Hybrid-JT) signal for transmission from a wireless network associated with the network entity to a user equipment (UE). The Hybrid-JT signal includes a diversity joint transmission (Div-JT) component and a multiplexing joint transmission (Mux-JT) component. The processor is further configured to instruct the wireless network to transmit the Hybrid-JT signal to the UE.

In another embodiment, method performed by a network entity is provided. The method includes determining a Hybrid-JT signal for transmission from a wireless network associated with the network entity to a UE. The Hybrid-JT signal includes a Div-JT component and a Mux-JT component. The method further includes instructing the wireless network to transmit the Hybrid-JT signal to the UE.

In yet another embodiment, a non-transitory computer readable medium embodying a computer program is provided. The computer program includes program code that, when executed by a processor of a device, causes the device to determine a first transmit receive point (TRP) rank and antenna ordering for a first TRP in a wireless network, and determine a second TRP rank and antenna ordering for a second TRP in the wireless network. Based on the first TRP rank and antenna ordering and the second TRP rank and antenna ordering, the computer program further causes the device to determine a Hybrid-JT signal including a Div-JT component and a Mux-JT component, and instruct the wireless network to transmit the Hybrid-JT signal to the UE. The Hybrid-JT signal is transmitted to the UE from the first TRP and the second TRP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 7 illustrates an example Hybrid-JT algorithm according to embodiments of the present disclosure;

FIG. 8 illustrates an example Hybrid-JT algorithm according to embodiments of the present disclosure;

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably arranged communications system.

Figure 1:
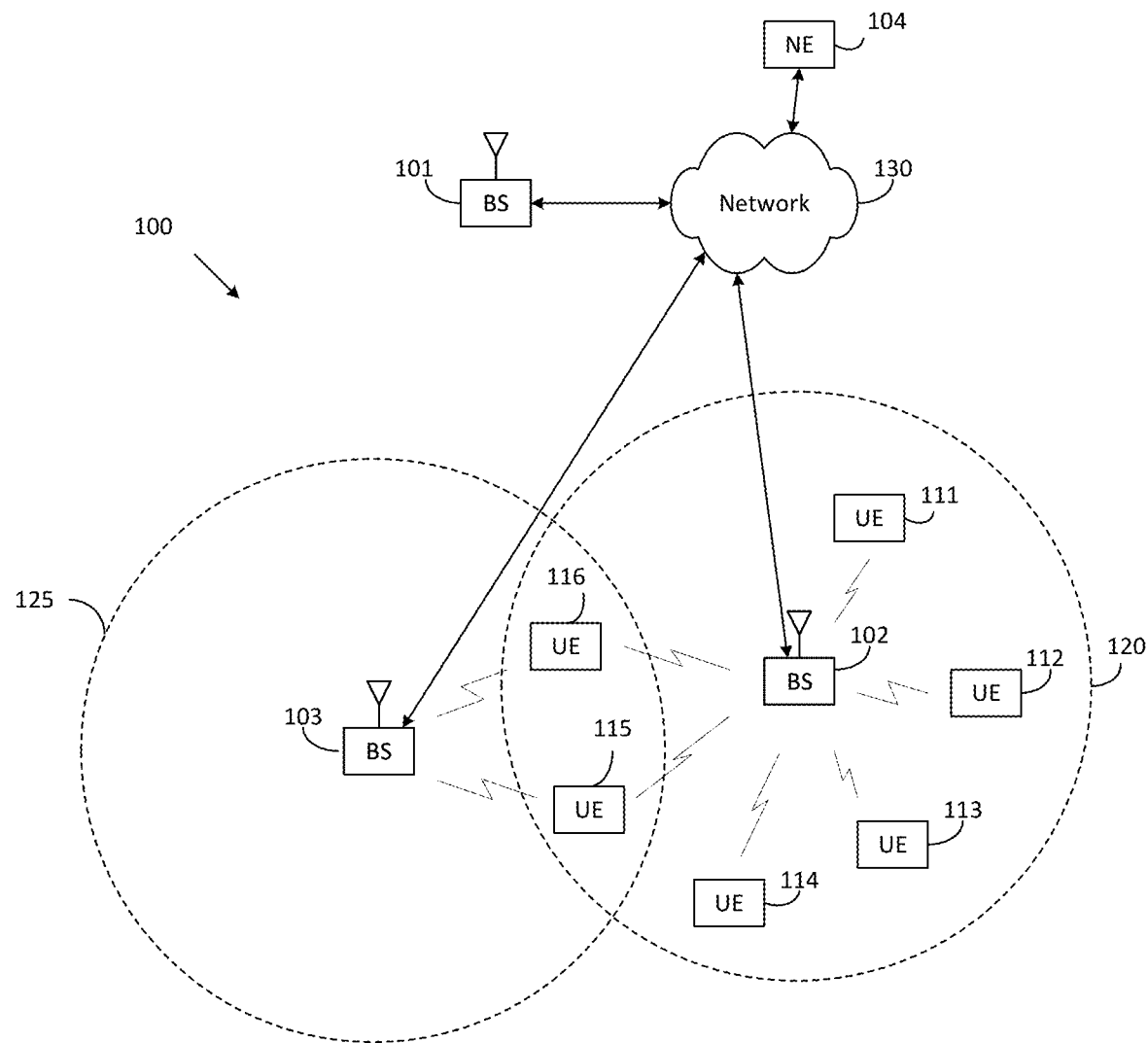
FIG. 1 illustrates an example wireless network according to embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the NE 104, the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 and NE 104 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for hybrid joint transmission for multiple antenna coordinated multipoint systems. In certain embodiments, network entity 104 includes circuitry, programing, or a combination thereof, to support hybrid joint transmission for multiple antenna coordinated multipoint systems in a wireless communication system. In certain embodiments, one or more of the gNBs 101-103 includes circuitry, programing, or a combination thereof, to support hybrid joint transmission for multiple antenna coordinated multipoint systems in a wireless communication system.

Although FIG. 1 illustrates one example of a wireless network, various changes may be made to FIG. 1. For example, the wireless network could include any number of gNBs, network entities, and any number of UEs in any suitable arrangement. Also, the gNB 101 could communicate directly with any number of UEs and provide those UEs with wireless broadband access to the network 130. Similarly, each gNB 102-103 could communicate directly with the network 130 and network entity 104 and provide UEs with direct wireless broadband access to the network 130. Further, the gNBs 101, 102, and/or 103 and/or network entity 104 could provide access to other or additional external networks, such as external telephone networks or other types of data networks.

Figure 2:
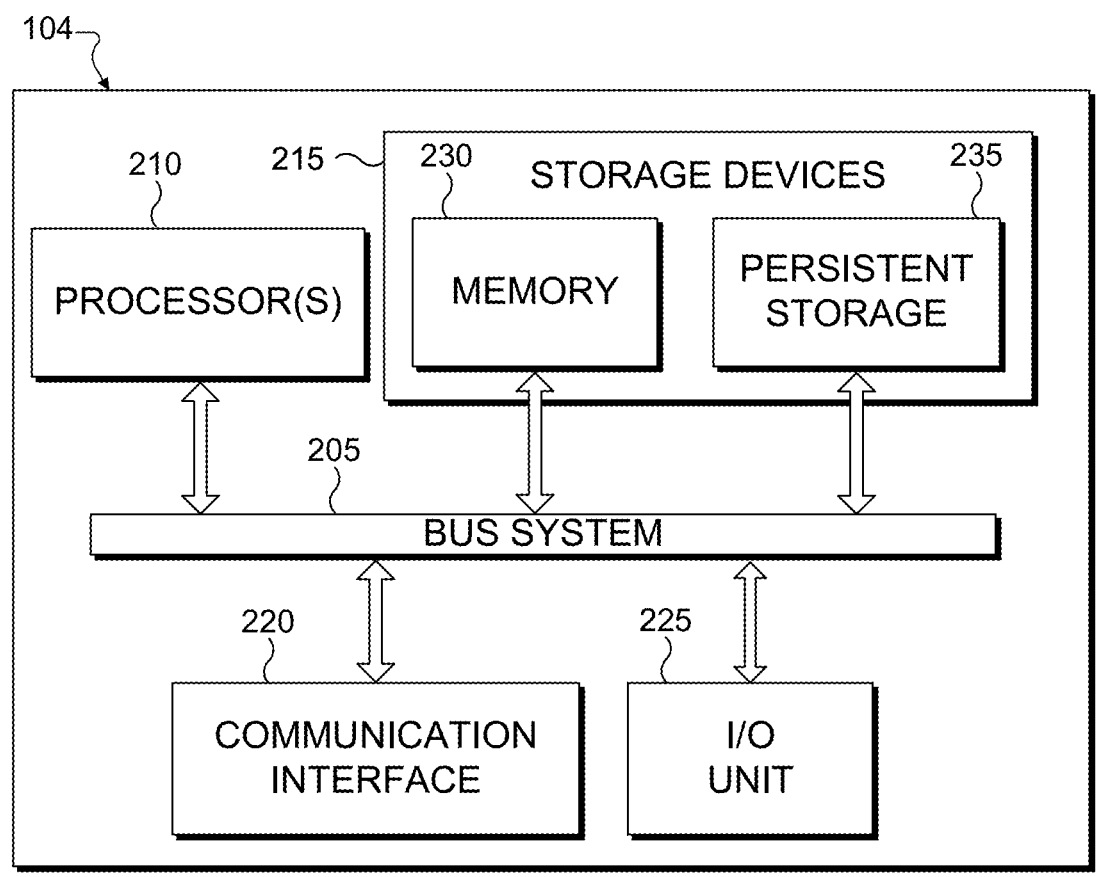
FIG. 2 illustrates an example network entity according to embodiments of the present disclosure.

FIG. 2 illustrates an example network entity (NE) 104 according to embodiments of the present disclosure. The embodiment of the NE 104 illustrated in FIG. 2 is for illustration only. However, NEs come in a wide variety of configurations, and FIG. 2 does not limit the scope of this disclosure to any particular implementation of an NE.

The network entity 104 can represent one or more local computing resources, remote computing resources, clustered computing resources, components that act as a single pool of seamless computing resources, a cloud-based computing resource, a virtualized computing resource, and the like. The network entity 104 can be accessed by one or more of the gNBs 101-103 and UEs 111-116 of FIG. 1 or another network entity.

As shown in FIG. 2, the network entity 104 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processor 210 include microprocessors, microcontrollers, digital signal processors, field programmable gate arrays, application specific integrated circuits, and discrete circuitry. In certain embodiments, the processor 210 can execute processes to support hybrid joint transmission for multiple antenna coordinated multipoint systems.

The memory 230 and a persistent storage 235 are examples of storage devices 215 that represent any structure (s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for supporting hybrid joint transmission for multiple antenna coordinated multipoint systems. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit operation instructions to another device such as one of gNBs 101, 102, and 103.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the network entity 104 occur via a network connection.

While the various components of network entity 104 are illustrated as discrete components such as processor 210, memory 230, and communications interface 220, all components or a subset of components of network entity 104 may be implemented as virtual components in a virtual resource, such as a virtual machine, a virtual server, software emulation, hardware emulation, and the like. In some embodiments, network entity 104 may be a virtual resource. In some embodiments, network entity 104 may be implemented entirely as computer program code operating on a separate apparatus.

In some circumstances, network entity 104 may be integrated into another apparatus. For example, network entity 104 may be integrated into gNB 102. For instance, gNB 102 may include hardware that performs the functions of network entity 104, may include virtual resources that perform the functions of network entity 104, may include software that performs the functions of network entity 104, and/or gNB 102 may perform the functions of network entity 104 as an inherent feature of gNB 102.

In some circumstances, a network entity may be implemented across multiple apparatuses. For example, network entity 104 may be implemented across gNB 102 and gNB 103 such that gNB 102 and gNB 103 form a single network entity 104.

Note that while FIG. 2 is described as representing the network entity 104 of FIG. 1, the same or similar structure could be used in one or more of the gNBs 101, 102, and 103.

Although FIG. 2 illustrates an example network entity, various changes can be made to FIG. 2. For example, various components in FIG. 2 could be combined, further subdivided, or omitted and additional components could be added according to particular needs. As a particular example, the processor 210 could be divided into multiple processors, such as one or more central processing units (CPUs).

Figure 3:
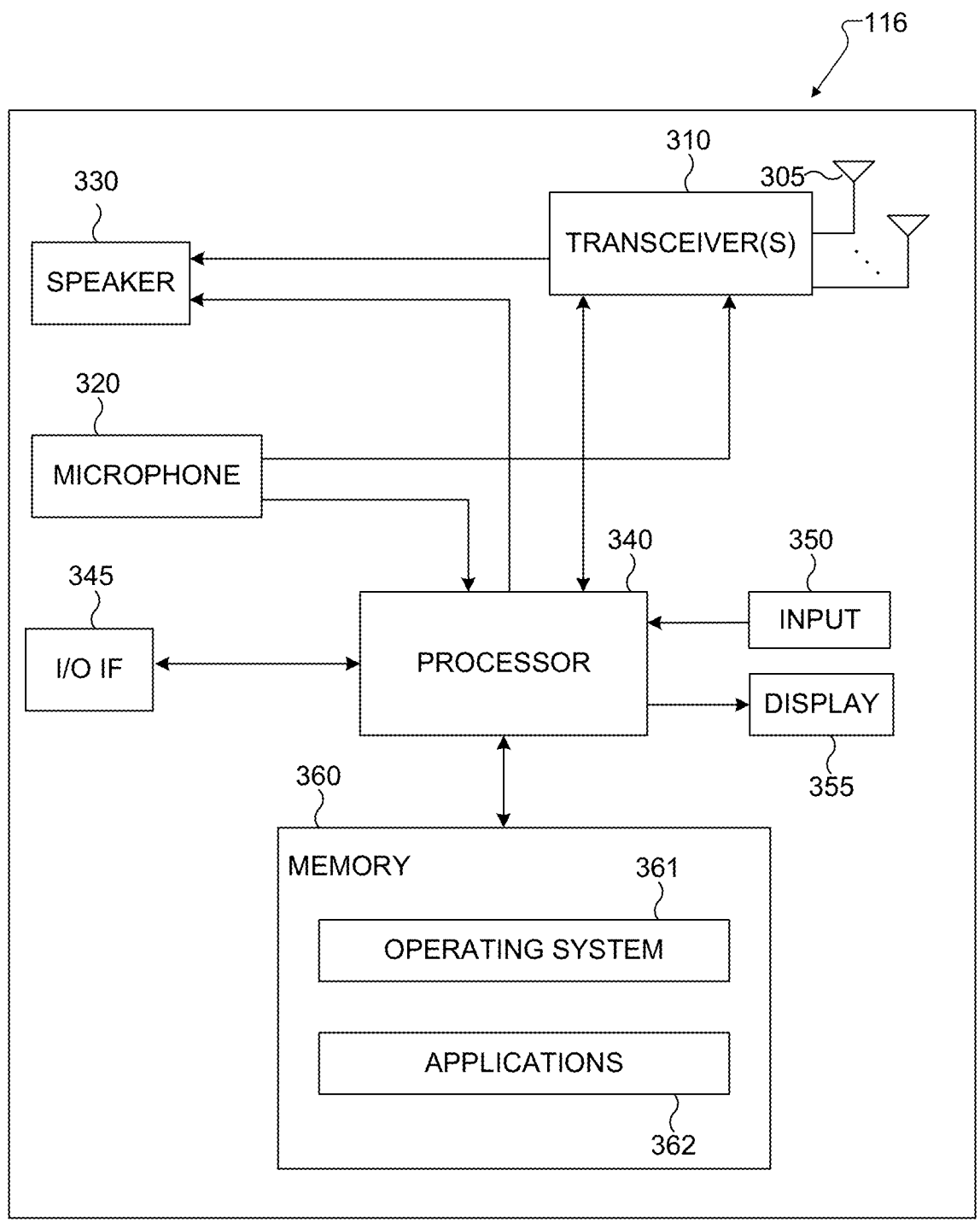
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for hybrid joint transmission for multiple antenna coordinated multipoint systems as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
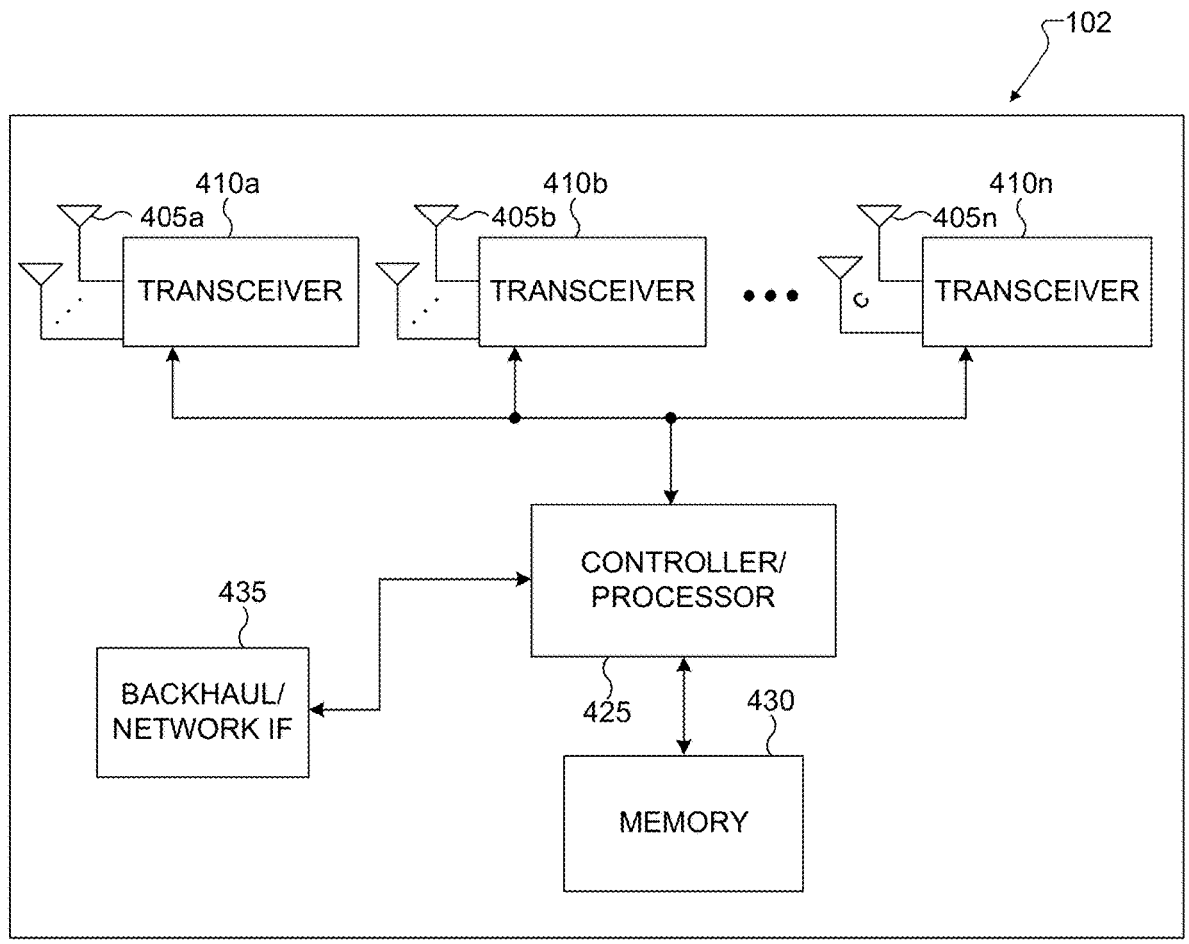
FIG. 4 illustrates an example gNB according to embodiments of the present disclosure.

FIG. 4 illustrates an example gNB 102 according to embodiments of the present disclosure. The embodiment of the gNB 102 illustrated in FIG. 4 is for illustration only, and the gNBs 101 and 103 of FIG. 1 could have the same or similar configuration. However, gNBs come in a wide variety of configurations, and FIG. 4 does not limit the scope of this disclosure to any particular implementation of a gNB.

As shown in FIG. 4, the gNB 102 includes multiple antennas 405a-405n, multiple transceivers 410a-410n, a controller/processor 425, a memory 430, and a backhaul or network interface 435.

The transceivers 410a-410n receive, from the antennas 405a-405n, incoming RF signals, such as signals transmitted by UEs in the network 100. The transceivers 410a-410n down-convert the incoming RF signals to generate IF or baseband signals. The IF or baseband signals are processed by receive (RX) processing circuitry in the transceivers 410a-410n and/or controller/processor 425, which generates processed baseband signals by filtering, decoding, and/or digitizing the baseband or IF signals. The controller/processor 425 may further process the baseband signals.

Transmit (TX) processing circuitry in the transceivers 410a-410n and/or controller/processor 425 receives analog or digital data (such as voice data, web data, e-mail, or interactive video game data) from the controller/processor 425. The TX processing circuitry encodes, multiplexes, and/or digitizes the outgoing baseband data to generate processed baseband or IF signals. The transceivers 410a-410n up-converts the baseband or IF signals to RF signals that are transmitted via the antennas 405a-405n.

The controller/processor 425 can include one or more processors or other processing devices that control the overall operation of the gNB 102. For example, the controller/processor 425 could control the reception of UL channel signals and the transmission of DL channel signals by the transceivers 410a-410n in accordance with well-known principles. The controller/processor 425 could support additional functions as well, such as more advanced wireless communication functions. For instance, the controller/processor 425 could support beam forming or directional routing operations in which outgoing/incoming signals from/to multiple antennas 405a-405n are weighted differently to effectively steer the outgoing signals in a desired direction.

Any of a wide variety of other functions could be supported in the gNB 102 by the controller/processor 425.

The controller/processor 425 is also capable of executing programs and other processes resident in the memory 430, such as an OS and, for example, processes to support hybrid joint transmission for multiple antenna coordinated multi-point systems as discussed in greater detail below. The controller/processor 425 can move data into or out of the memory 430 as required by an executing process.

The controller/processor 425 is also coupled to the backhaul or network interface 435. The backhaul or network interface 435 allows the gNB 102 to communicate with other devices or systems over a backhaul connection or over a network. The interface 435 could support communications over any suitable wired or wireless connection(s). For example, when the gNB 102 is implemented as part of a cellular communication system (such as one supporting 5G/NR, LTE, or LTE-A), the interface 435 could allow the gNB 102 to communicate with other gNBs over a wired or wireless backhaul connection. When the gNB 102 is implemented as an access point, the interface 435 could allow the gNB 102 to communicate over a wired or wireless local area network or over a wired or wireless connection to a larger network (such as the Internet). The interface 435 includes any suitable structure supporting communications over a wired or wireless connection, such as an Ethernet or transceiver.

The memory 430 is coupled to the controller/processor 425. Part of the memory 430 could include a RAM, and another part of the memory 430 could include a Flash memory or other ROM.

Although FIG. 4 illustrates one example of gNB 102, various changes may be made to FIG. 4. For example, the gNB 102 could include any number of each component shown in FIG. 4. Also, various components in FIG. 4 could be combined, further subdivided, or omitted and additional components could be added according to particular needs.

In coordinated multi-point systems, two or more TRPs can jointly transmit data to the same UE (serving UE). In the following, the joint transmission of two TRPs is described, but it may be extended to higher number of TRPs as needed. In these joint transmissions, TRPs can use any method to produce SRS-based precoder vectors such as ZFBF, BD, SLNR, MRT, or PMI-based precoders.

Figure 5:
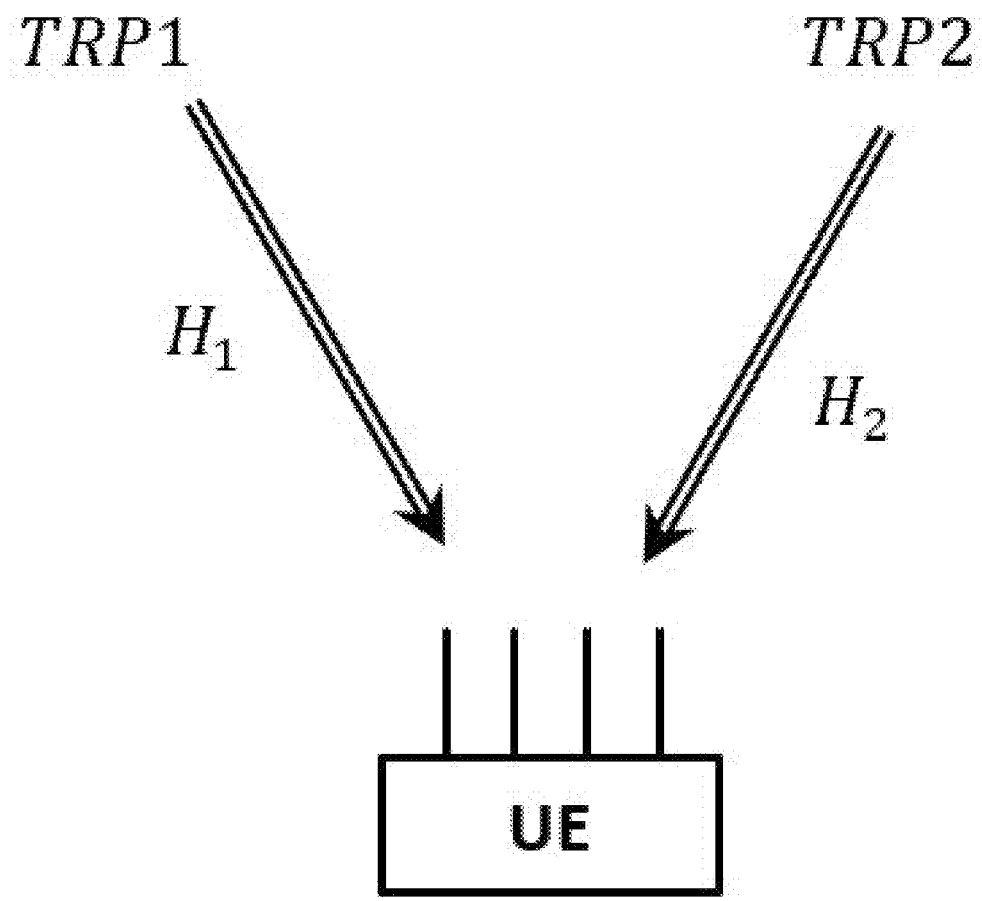
FIG. 5 illustrates an example multi-point system for distributed MIMO according to embodiments of the present disclosure.

FIG. 5 illustrates an example multi-point system for distributed MIMO according to embodiments of the present disclosure. The embodiment of the multi-point system for distributed MIMO of FIG. 5 is for illustration only. Other embodiments of a multi-point system for distributed MIMO could be used without departing from the scope of this disclosure.

The example of FIG. 5 illustrates 2 TRPs (Serving TRP1 and Helping TRP2) serving a UE. $H_1$, $H_2$ are the channels from TRP1 and TRP2 to the serving UE respectively. The signal model is as follows:

$$y = \left( H_1 \sum_{i=1}^{L} b_1(i) \cdot p_{1,a_1(i)} x_i + H_2 \sum_{i=1}^{L} b_2(i) \cdot p_{2,a_2(i)} x_i \right) + n$$

Where L is total number of layers sent from two TRPs, $x_i$ is the data transmitted on the i-th layer $a_1(i)$, $a_2(i)$ are permutation of {1, 2, 3, 4}, which is antenna port ordering of the UE (assuming UE has 4 antennas) with respect to the precoder at the two TRPs, $b_1(i)$, $b_2(i)$ are the control parameters that take the binary values of 0 or 1; (0 means no transmission and 1 with transmission). $p_{1,a_1(i)}$ and $p_{2,a_2(i)}$ are i-th layer's precoder from TRP1 and TRP2, respectively. If $b_k(i)=0$, this precoder is NOT included in the transmission, and the i-th layer is not transmitted by the TRP k. In addition, the i-th layer from TRP k with precoder $p_{k,a_k(i)}$ is targeted at the $a_k(i)$-th antenna of UE.

Although FIG. 5 illustrates one example of a multi-point system for distributed MIMO, various changes may be made to FIG. 5. For example, the number of TRPs may change, the number of antennas comprised by the UE may change, etc.

With this general joint transmission model, the optimized solution would be the one that maximizes the mutual information or capacity formula:

$$\text{maximize}_{a_k(i), b_k(i), L} I(y;x|H_1, H_2)$$

subject to the constraint that beamforming algorithms are applied to $H_1$, $H_2$ respectively.

One consideration is that if two TRPs transmit same data stream/layer, it is desired to have them transmitted towards the same UE antenna for maximum power boosting. This general problem covers two optimization parameters in the current precoder designs:

Layer decision and allocation→L, $b_1(i)$, $b_2(i)$
Antenna order algorithm→$a_1(i)$, $a_2(i)$ With the constraints:
(1) TRP independently implements beamforming algorithm
(2) antenna selection based on orthogonality The above problem is complex. Therefore, the present disclosure provides several methods to improve system throughput. The concept of this disclosure is to utilize the multiple TRPs to obtain both diversity gain (i.e., to boost reception power) and multiplexing gain (i.e. to transmit more layers utilizing the TRPs' channel diversity).

In one embodiment, the layer decision and allocation, and antenna ordering algorithms are performed by a network entity, such as serving TRP1. Then the above information is forwarded to TRP2, and TRP2 applies this information to design its own precoder vectors to perform the joint transmission. In this embodiment diversity gain is obtained from the multi TRPs.

In another embodiment, when signal to interference and noise ratio (SINR) is low and two TRPs only allow to transmit with rank-1 transmission, the system signal model is reduced to:

$$Y = H_1 p_{1,a_1} + H_2 p_{2,a_2}) x_1 + N$$

Where $b_1 = b_2 = 1$, since there is only one transmitted layer. $a_1$, $a_2$: the UE antenna port to which ZFBF vectors of two channels $H_1$, $H_2$ are designed. Intuitively, to increase the level of coherent combining of the two beamformed Rx signals from the two TRPs, we should have $a_1 = a_2$, which is chosen as to maximize the sum power across interested radio bearers (RBs) from both TRPs:

$$a_1 = a_2 = \max_{i} \sum_{r=1}^{RB\_max} (|h^r_{1,i}|^2 + |h^r_{2,i}|^2), i = \{1, 2, 3, 4\}$$

where r=1, ..., $RB_{max}$ are the set of interested RBs of both TRPs.

In another embodiment, when two TRPs only allow to transmit with rank-1 transmission, the antenna order $a_1 = a_2$ can be chosen by maximizing the signal powers between two TRPs as:

$$a_1 = a_2 = \max\left\{\max_i \sum_{k=1}^{RB\_max} \left(|h_{1,i}^r|^2\right), \max_j \sum_{k=1}^{RB\_max} \left(|h_{2,j}^r|^2\right)\right\},$$

$$i, j = \{1, 2, 3, 4\}$$

where r=1, ..., $RB_{max}$ are the set of interested RBs of both TRPs.

In another embodiment, hybrid joint transmission (Hybrid-JT) with joint antenna selection is disclosed to provide a general design framework that includes both diversity JT (Div-JT) and multiplexing JT (Mux-JT).

In diversity JT (coherent joint transmission), two TRPs transmit the same signal to the serving UE, with independent antenna ordering:

$$y = H_1 F_1 s + H_2 F_2 s + n = (\tilde{H}_1 + \tilde{H}_2) s + n$$

where $H_1$, $H_2 \in \mathbb{C}^{4 \times 64}$: channels from TRP1 and TRP2 to UE, $F_1 \in \mathbb{C}^{64 \times 4}$, $F_2 \in \mathbb{C}^{64 \times 4}$: ZF precoders from TRP1, TRP2 with rank r, and $\tilde{H}_1$ and $\tilde{H}_2$ have size of $\{4 \times r\}$.

In multiplexing JT (non-coherent joint transmission), two TRPs will transmit different signals with independent antenna ordering:

$$y = H_1 F_1 r + H_2 F_2 s + n = [\tilde{H}_1 \tilde{H}_2]\begin{bmatrix} r \\ s \end{bmatrix} + n$$

where $H_1$, $H_2 \in \mathbb{C}^{4 \times 64}$: channels from TRP1 and TRP2 to UE, $F_1 \in \mathbb{C}^{64 \times 4_1}$, $F_2 \in \mathbb{C}^{64 \times r_2}$: ZF precoders from TRP1 with rank $r_1$ and TRP2 with rank $r_2$, and $\tilde{H}\_1$ has size of $\{4 \times r\_1\}$ and $\tilde{H}_1$ has size of $\{4 \times r_1\}$ and $\tilde{H}_2$ has size of $\{4 \times r_2\}$.

Figure 6:
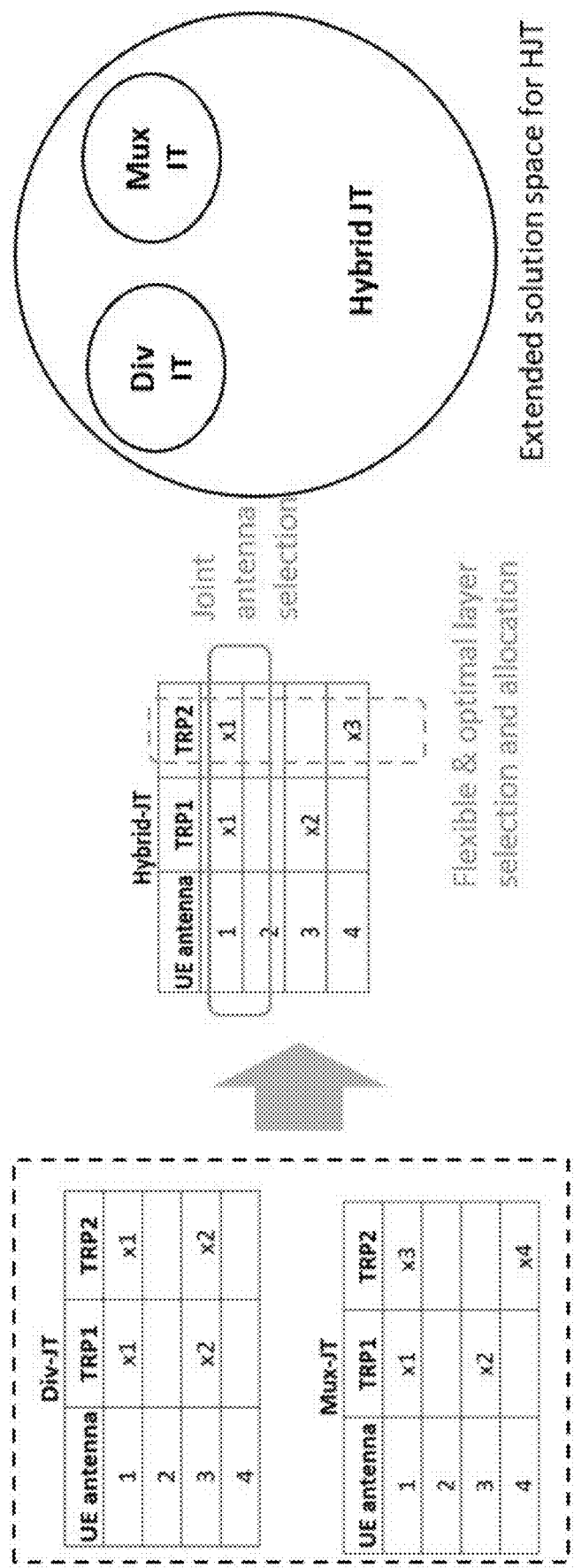
FIG. 6 illustrates an example of Hybrid-JT for distributed MIMO according to embodiments of the present disclosure.

Overall capacity may be maximized by using joint antenna ordering and flexible and optimal layer selection and allocation as illustrated in FIG. 6.

FIG. 6 illustrates an example of hybrid joint transmission (Hybrid-JT) for distributed MIMO according to embodiments of the present disclosure. The embodiment of Hybrid-JT for distributed MIMO of FIG. 6 is for illustration only. Other embodiments of Hybrid-JT for distributed MIMO could be used without departing from the scope of this disclosure.

In Div-JT, TRP2 can help boost the power of layers x1 and x2. In Mux-JT, TRP2 can help to transmit new layers x3, x4. In the following Hybrid-JT example, TRP2 can both help boost the power of layer x1, and also help to transmit an extra layer x3.

In the Hybrid-JT example of FIG. 6, subject to the constraint of TRPs performing independent ZFBF, optimally:
- TRPs are not forced to send the same or completely different signals (flexible & optimal layer selection and allocation)
- antenna selection and ordering are selected to maximize overall capacity (joint antenna selection)

In this example, for each TRP, let $F_k = f_k(H_k)$, $G_k = g_k(H_k)$. For optimization:

$$\max_{\{f_k(\cdot),g_k(\cdot)\}} E\left[\log\det\left(I + \frac{1}{\sigma^2}\left(\left|\sum_{k=1}^{2} H_k f_k(H_k)\right|^2 + \sum_{k=1}^{2} |H_k g_k(H_k)|^2\right)\right)\right]$$

$$\text{s.t } tr\{|f_k(H_k)|^2 + |g_k(H_k)|^2\} \leq P_k, \forall H_k, k = 1, 2$$

where $f_k(H_k)$, $g_k(H_k)$ are functions of channel $H_k$, which can be ZF, MMSE, SVD precoders, etc.

Although FIG. 6 illustrates one example of a hybrid joint transmission (Hybrid-JT) for distributed MIMO, various changes may be made to FIG. 6. For example, the number of TRPs may change, the type of precoder may change, etc.

In one embodiment, as illustrated in FIG. 7, TRP1 and TRP2 decide their own antenna ordering and layer decision. This may be referred to as a joint antenna ordering and joint rank decision.

FIG. 7 illustrates an example Hybrid-JT algorithm according to embodiments of the present disclosure. The embodiment of the Hybrid-JT algorithm of FIG. 7 is for illustration only. Other embodiments of Hybrid-JT algorithms could be used without departing from the scope of this disclosure.

In the example of FIG. 7, TRP1 and TRP2 decide their own antenna ordering and layer decision $a_1(i)$, $a_2(i)$, $i=\{1, \ldots, L\}$, where L is the total number of transmitted layers in the JT system. Then the union set of the active selected UE Rx antennas of the two TRPs, which is defined as $a_{k,active} = a_k \& b_k$ $$a_{u,active} = a_{1,active} \cup a_{2,active}$$

and the new rank of the JT system is:

L=nonzero elements in $a_{u,active}$

In this embodiment, all antennas in the union set will be assigned to one layer of signal. Intersection antenna ports will be used to transmit the same data streams. For example, in case both TRPs use rank-2 transmission Step 1: preliminary rank and antenna ordering decision
    Each TRP decides its own antenna ordering and layer decision: $a_1(i)$, $a_2(i)$, $i=\{1,2\}$. This may be referred to as a.
Step 2: joint layer mapping decision
    If $(a_1(i) \cap a_2(i))=2 \rightarrow$ case 1: TRP2 follows TRP1$\rightarrow$rank-2 transmission
    If $(a_1(i) \cap a_2(i))=1 \rightarrow$ case 2: TRP2 helps 1 layer and transmits 1 new layer$\rightarrow$rank-3 JT transmission
    If $(a_1(i) \cap a_2(i))=0 \rightarrow$ case 3: TRP2 transmits 2 new layers$\rightarrow$make rank-4 JT transmission Although FIG. 7 illustrates one example of a hybrid joint transmission algorithm, various changes may be made to FIG. 7. For example, the number of TRPs may change, the type of precoder may change, etc.

In one embodiment, as illustrated in FIG. 8, TRP1 may transmit as its normal transmission. Then TRP2, depending on the channel conditions, might remove one or several transmitted layer from its own selected antenna ports.

FIG. 8 illustrates an example Hybrid-JT algorithm according to embodiments of the present disclosure. The embodiment of the Hybrid-JT algorithm of FIG. 8 is for illustration only. Other embodiments of Hybrid-JT algorithms could be used without departing from the scope of this disclosure.

In the example of FIG. 8, TRP1 will transmit as its normal transmission. Then TRP2, depending on the channel conditions, might remove one or several transmitted layers from its own selected antenna ports.

For example, in case both TRPs use rank-2 transmission
Step 1:
    Each TRP decides its own antenna ordering and layer decision: $a_1(i)$, $a_2(i)$, $i=\{1,2\}$
Step 2: Select helping cell modes
    If $(a_1(i) \cap a_2(i))=2 \rightarrow$ case 1: TRP2 may allocate more power in one transmitted layer$\rightarrow$rank-2 transmission.

If $(a_1(i) \cap a_2(i))=1 \rightarrow$ case 2: TRP2 may transmit one new layer→rank-3 transmission;
or power-boost an existing layer→rank-2 transmission.
If $(a_1(i) \cap a_2(i))=0 \rightarrow$ case 3: TRP2 might allocate more power to one new layer only→rank-3 transmission.

The above steps will produce a joint optimization that will produce the upper-bound throughput.

In the example above, different methods may be applied to reduce the search space.

In one embodiment, a network entity such as TRP1 computes the rank and antenna ordering for TRP1, and TRP2 follows the rank and antenna ordering of TRP1.

In one embodiment, a determination is made which TRP has a higher reference signal receive power (RSRP), and the TRP with a lower RSRP follows the rank and antenna ordering of the TRP with the higher RSRP.

In one embodiment, the rank and antenna ordering for TRP1 is determined based on a channel state of TRP1, and the rank and antenna ordering of TRP2 is determined based on a channel state of TRP2.

Although FIG. 8 illustrates one example of a hybrid joint transmission algorithm, various changes may be made to FIG. 8. For example, the number of TRPs may change, the type of precoder may change, etc.

Figure 9:
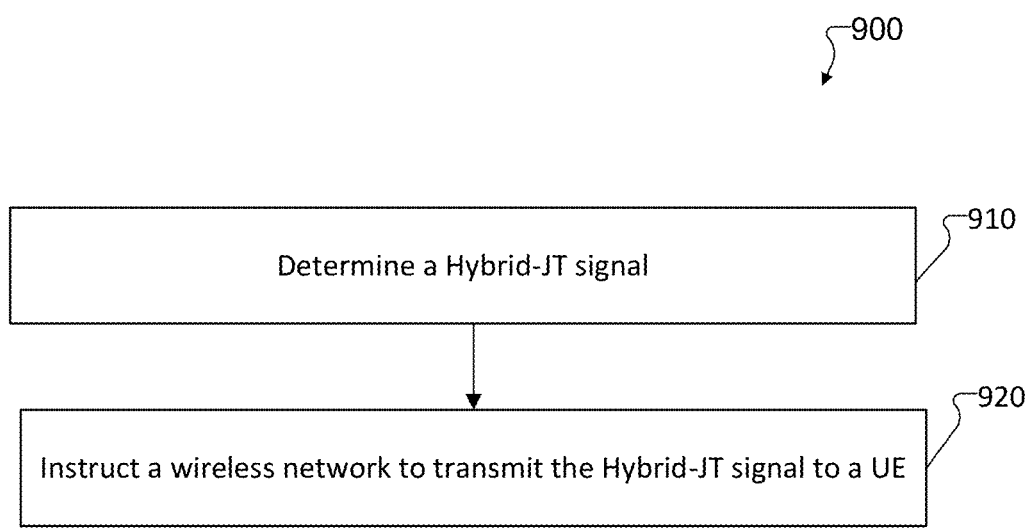
FIG. 9 illustrates an example method for hybrid joint transmission according to embodiments of the present disclosure.

FIG. 9 illustrates an example method 900 for hybrid joint transmission according to embodiments of the present disclosure. An embodiment of the method illustrated in FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 9, the method 900 begins at step 910. At step 910, an determines a Hybrid-JT signal. The Hybrid-JT signal may be similar as described herein. At step 920, the NE instructs a wireless network to transmit the Hybrid-JT signal to a UE. The transmission of the Hybrid-JT signal may be similar as described herein.

Although FIG. 9 illustrates one example of a method 900 for hybrid joint transmission, various changes may be made to FIG. 9. For example, while shown as a series of steps, various steps in FIG. 9 could overlap, occur in parallel, occur in a different order, or occur any number of times.

Figure 10:
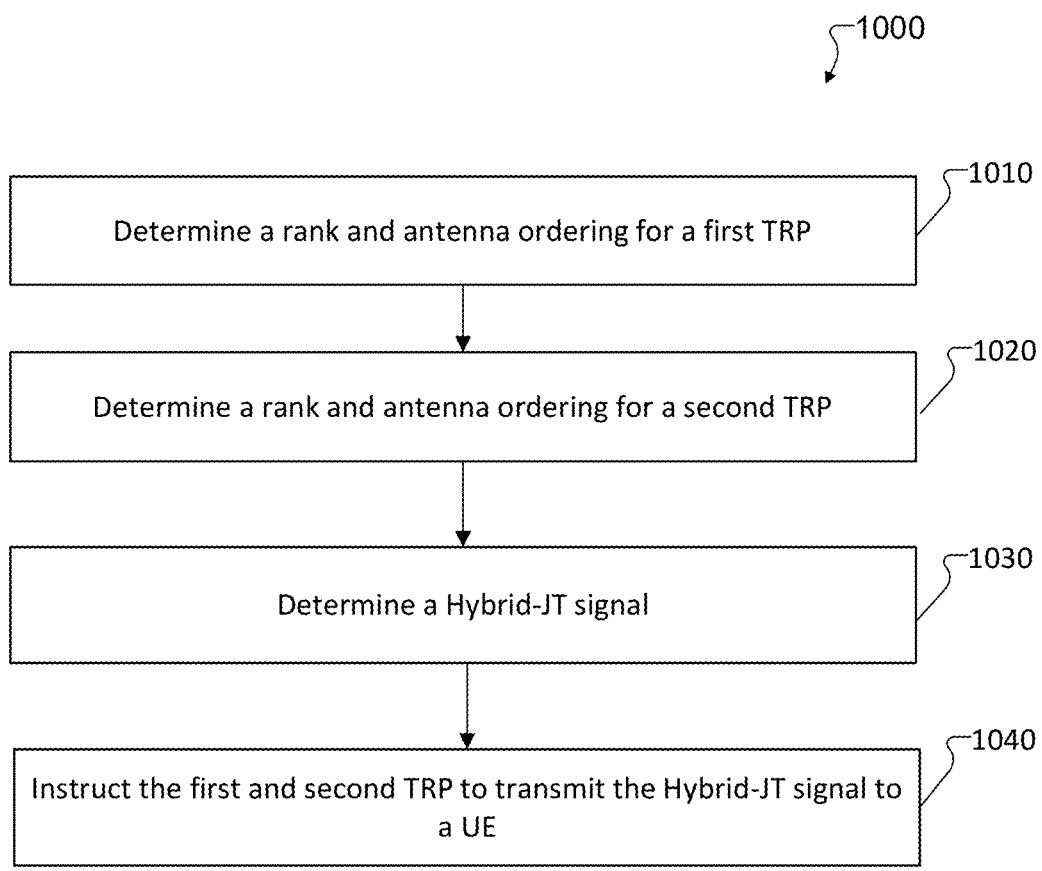
FIG. 10 illustrates an example method for hybrid joint transmission according to embodiments of the present disclosure.

FIG. 10 illustrates an example method 1000 for hybrid joint transmission according to embodiments of the present disclosure. An embodiment of the method illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 10, the method 1000 begins at step 1010. At step 1010, an NE determines a rank and antenna ordering for a first TRP. At step 1020, the NE determines a rank and antenna ordering for a second TRP. At step 1030, the NE determines a Hybrid-JT signal. The Hybrid-JT signal may be based on the rank and antenna ordering determined for the first and second TRP. At step 1040, the NE instructs the first and second TRP to transmit the Hybrid-JT signal to the UE.

Although FIG. 10 illustrates one example of a method 1000 for hybrid joint transmission, various changes may be made to FIG. 10. For example, while shown as a series of steps, various steps in FIG. 10 could overlap, occur in parallel, occur in a different order, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A network entity comprising:
a memory; and
a processor operably coupled to the memory, the processor configured to:
determine a first transmit receive point (TRP) rank and antenna ordering for a first TRP in a wireless network;
determine a second TRP rank and antenna ordering for a second TRP in the wireless network;
based on the first TRP rank and antenna ordering and the second TRP rank and antenna ordering, determine a hybrid joint transmission (Hybrid-JT) signal for transmission from the wireless network to a user equipment (UE), the Hybrid-JT signal comprising a diversity joint transmission (Div-JT) component and a multiplexing joint transmission (Mux-JT) component; and
instruct the wireless network to transmit the Hybrid-JT signal to the UE, wherein the Hybrid-JT signal is transmitted to the UE from the first TRP and the second TRP.

2. The network entity of claim 1, wherein to determine the Hybrid-JT signal the processor is further configured to:
determine a first TRP first preliminary rank and antenna ordering;
determine a second TRP first preliminary rank and antenna ordering based on the first TRP first preliminary rank and antenna ordering;
determine a second TRP second preliminary rank and antenna ordering;
determine first TRP second preliminary rank and antenna ordering based on the second TRP second preliminary rank and antenna; and
determine an optimized rank and antenna ordering based on:
the first TRP first preliminary rank and antenna ordering;
the second TRP first preliminary rank and antenna ordering;
the second TRP second preliminary rank and antenna ordering; and
and first TRP second preliminary rank and antenna ordering,
wherein the first TRP rank and antenna ordering and the second TRP rank and antenna ordering are based on the optimized rank and antenna ordering.

3. The network entity of claim 1, wherein the second TRP rank and antenna ordering are identical to the first TRP rank and antenna ordering.

4. The network entity of claim 1, wherein to determine the Hybrid-JT signal, the processor is further configured to:
determine a reference signal receive power (RSRP) for the first TRP;

determine an RSRP for the second TRP;
determine whether the RSRP for the first TRP is higher than the RSRP for the second TRP; and
determine whether the RSRP for the second TRP is higher than the RSRP for the first TRP;
wherein if the RSRP for the first TRP is higher than the RSRP for the second TRP:
the first TRP rank and antenna ordering are determined based on the RSRP for the first TRP being higher than the RSRP for the second TRP, and
the second TRP rank and antenna ordering are determined based on the first TRP rank and antenna ordering; and
wherein if the RSRP for the second TRP is higher than the RSRP for the first TRP:
the second TRP rank and antenna ordering are determined based on the RSRP for the second TRP being higher than the RSRP for the first TRP, and
the first TRP rank and antenna ordering are determined based on the second TRP rank and antenna ordering.

5. The network entity of claim 1, wherein to determine the Hybrid-JT signal the processor is further configured to:
determine a first TRP channel state; and
determine a second TRP channel state,
wherein the first TRP rank and antenna ordering is determined based on the first TRP channel state, and the second TRP rank and antenna ordering is determined based on the second TRP channel state.

6. The network entity of claim 1, wherein to determine the Hybrid-JT signal the processor is further configured to:
determine a first TRP preliminary rank and antenna ordering decision;
determine a second TRP preliminary rank and antenna ordering decision;
determine a joint rank decision based on the first TRP preliminary antenna ordering decision and the second TRP preliminary antenna ordering decision; and
determine a joint antenna ordering and layer mapping decision based on the joint rank decision, the first TRP preliminary antenna ordering and rank decision, and the second TRP preliminary antenna ordering and rank decision,
wherein the first TRP rank and antenna ordering and the second TRP rank and antenna ordering are based on the joint antenna ordering and layer mapping decision.

7. The network entity of claim 1, wherein:
the first TRP rank is determined to be rank-1;
based on the first TRP rank determination being rank-1, the second TRP rank is determined to be rank-1, and the determined first TRP antenna ordering and the determined second TRP antenna ordering provide one of:
a maximum sum power from the first TRP and the second TRP across all radio bearers (RBs); and
a maximum signal power of two TRP channels from the first TRP and the second TRP across all RBs.

8. A method performed by a network entity, the method comprising:
determining a first transmit receive point (TRP) rank and antenna ordering for a first TRP in a wireless network;
determine a second TRP rank and antenna ordering for a second TRP in the wireless network;
based on the first TRP rank and antenna ordering and the second TRP rank and antenna ordering, determining a hybrid joint transmission (Hybrid-JT) signal for transmission from the wireless network to a user equipment (UE), the Hybrid-JT signal comprising a diversity joint transmission (Div-JT) component and a multiplexing joint transmission (Mux-JT) component; and
instruct the wireless network to transmit the Hybrid-JT signal to the UE, wherein the Hybrid-JT signal is transmitted to the UE from the first TRP and the second TRP.

9. The method of claim 8, wherein determining the Hybrid-JT signal further comprises:
determining a first TRP first preliminary rank and antenna ordering;
determining a second TRP first preliminary rank and antenna ordering based on the first TRP first preliminary rank and antenna ordering;
determining a second TRP second preliminary rank and antenna ordering;
determining first TRP second preliminary rank and antenna ordering based on the second TRP second preliminary rank and antenna; and
determining an optimized rank and antenna ordering based on:
the first TRP first preliminary rank and antenna ordering;
the second TRP first preliminary rank and antenna ordering;
the second TRP second preliminary rank and antenna ordering; and
and first TRP second preliminary rank and antenna ordering,
wherein the first TRP rank and antenna ordering and the second TRP rank and antenna ordering are based on the optimized rank and antenna ordering.

10. The method of claim 8, wherein the second TRP rank and antenna ordering are identical to the first TRP rank and antenna ordering.

11. The method of claim 8, wherein determining the Hybrid-JT signal further comprises:
determining a reference signal receive power (RSRP) for the first TRP;
determining an RSRP for the second TRP;
determining whether the RSRP for the first TRP is higher than the RSRP for the second TRP; and
determining whether the RSRP for the second TRP is higher than the RSRP for the first TRP,
wherein if the RSRP for the first TRP is higher than the RSRP for the second TRP:
the first TRP rank and antenna ordering are determined based on the RSRP for the first TRP being higher than the RSRP for the second TRP, and
the second TRP rank and antenna ordering are determined based on the first TRP rank and antenna ordering; and
wherein if the second TRP is higher than the RSRP for the first TRP:
the second TRP rank and antenna ordering are determined based on the RSRP for the second TRP being higher than the RSRP for the first TRP, and
the first TRP rank and antenna ordering are determined based on the second TRP rank and antenna ordering.

12. The method of claim 8, wherein determining the Hybrid-JT signal further comprises:
determine a first TRP channel state; and
determine a second TRP channel state,
wherein the first TRP rank and antenna ordering is determined based on the first TRP channel state, and the second TRP rank and antenna ordering is determined based on the second TRP channel state.

13. The method of claim 8, wherein determining the Hybrid-JT signal further comprises:
- determining a first TRP preliminary antenna ordering and rank decision;
- determining a second TRP preliminary antenna ordering and rank decision;
- determining a joint rank decision based on the first TRP preliminary antenna ordering decision and the second TRP preliminary antenna ordering decision; and
- determining a joint antenna ordering and layer mapping decision based on the joint rank decision, the first TRP preliminary antenna ordering and rank decision, and the second TRP preliminary antenna ordering and rank decision,
- wherein the first TRP rank and antenna ordering and the second TRP rank and antenna ordering are based on the joint antenna ordering and layer mapping decision.

14. The method of claim 8, wherein:
- the first TRP rank is determined to be rank-1;
- based on the first TRP rank determination being rank-1, the second TRP rank is determined to be rank-1, and the determined first TRP antenna ordering and the determined second TRP antenna ordering provide one of:
  - a maximum sum power from the first TRP and the second TRP across all radio bearers (RBs); and
  - a maximum signal power of two TRP channels from the first TRP and the second TRP across all RBs.

15. A non-transitory computer readable medium embodying a computer program, the computer program comprising program code that, when executed by a processor of a device, causes the device to:
- determine a first transmit receive point (TRP) rank and antenna ordering for a first TRP in a wireless network;
- determine a second TRP rank and antenna ordering for a second TRP in the wireless network;
- based on the first TRP rank and antenna ordering and the second TRP rank and antenna ordering, determine a hybrid joint transmission (Hybrid-JT) signal for transmission from the wireless network to a user equipment (UE), the Hybrid-JT signal comprising a diversity joint transmission (Div-JT) component and a multiplexing joint transmission (Mux-JT) component; and
- instruct the wireless network to transmit the Hybrid-JT signal to the UE, wherein the Hybrid-JT signal is transmitted to the UE from the first TRP and the second TRP.

16. The non-transitory computer readable medium of claim 15, wherein to determine the Hybrid-JT signal the computer program further comprises program code that, when executed by the processor of the device causes the device to:
- determine a first TRP first preliminary rank and antenna ordering;
- determine a second TRP first preliminary rank and antenna ordering based on the first TRP first preliminary rank and antenna ordering;
- determine a second TRP second preliminary rank and antenna ordering;
- determine first TRP second preliminary rank and antenna ordering based on the second TRP second preliminary rank and antenna; and
- determine an optimized rank and antenna ordering based on:
  - the first TRP first preliminary rank and antenna ordering;
  - the second TRP first preliminary rank and antenna ordering;
  - the second TRP second preliminary rank and antenna ordering; and
  - and first TRP second preliminary rank and antenna ordering,
- wherein the first TRP rank and antenna ordering and the second TRP rank and antenna ordering are based on the optimized rank and antenna ordering.

17. The non-transitory computer readable medium of claim 15, wherein to determine the Hybrid-JT signal the computer program further comprises program code that, when executed by the processor of the device causes the device to:
- determine a first TRP preliminary antenna ordering and rank decision;
- determine a second TRP preliminary antenna ordering and rank decision;
- determine a joint rank decision based on the first TRP preliminary antenna ordering decision and the second TRP preliminary antenna ordering decision; and
- determine a joint antenna ordering and layer mapping decision based on the joint rank decision, the first TRP preliminary antenna ordering and rank decision, and the second TRP preliminary antenna ordering and rank decision,
- wherein the first TRP rank and antenna ordering and the second TRP rank and antenna ordering are based on the joint antenna ordering and layer mapping decision.

18. The non-transitory computer readable medium of claim 15, wherein:
- the first TRP rank is determined to be rank-1;
- based on the first TRP rank determination being rank-1, the second TRP rank is determined to be rank-1, and the determined first TRP antenna ordering and the determined second TRP antenna ordering provide one of:
  - a maximum sum power from the first TRP and the second TRP across all radio bearers (RBs); and
  - a maximum signal power of two TRP channels from the first TRP and the second TRP across all RBs.

19. The non-transitory computer readable medium of claim 15, wherein the second TRP rank and antenna ordering are identical to the first TRP rank and antenna ordering.

20. The non-transitory computer readable medium of claim 15, wherein to determine the Hybrid-JT signal, the computer program further comprises program code that, when executed by the processor of the device causes the device to:
- determine a first TRP channel state; and
- determine a second TRP channel state,
- wherein the first TRP rank and antenna ordering is determined based on the first TRP channel state, and the second TRP rank and antenna ordering is determined based on the second TRP channel state.

* * * * *